(12) United States Patent
Durand

(10) Patent No.: US 9,495,880 B2
(45) Date of Patent: Nov. 15, 2016

(54) SELF CORRECTING FITNESS TEST

(71) Applicant: RivalHealth LLC, Raleigh, NC (US)

(72) Inventor: Peter Thomas Durand, Cary, NC (US)

(73) Assignee: RivalHealth, LLC, Raleigh, NC (US)

( * ) Notice: Subject to any disclaimer, the term of this patent is extended or adjusted under 35 U.S.C. 154(b) by 115 days.

(21) Appl. No.: 14/105,405

(22) Filed: Dec. 13, 2013

(65) Prior Publication Data
US 2014/0106322 A1 Apr. 17, 2014

Related U.S. Application Data

(63) Continuation-in-part of application No. 13/187,583, filed on Jul. 21, 2011, now abandoned.

(51) Int. Cl.
| | | |
|---|---|---|
| A63B 15/02 | (2006.01) | |
| G09B 9/00 | (2006.01) | |
| G09B 5/00 | (2006.01) | |
| G09B 19/00 | (2006.01) | |

(52) U.S. Cl.
CPC .............. *G09B 5/00* (2013.01); *G09B 19/0038* (2013.01)

(58) Field of Classification Search
USPC .......... 482/1–148; 700/91; 702/141; 434/247
See application file for complete search history.

(56) References Cited

U.S. PATENT DOCUMENTS

| | | | | |
|---|---|---|---|---|
| 4,566,461 A * | 1/1986 | Lubell et al. | ................ | 600/481 |
| 5,207,621 A * | 5/1993 | Koch et al. | .................... | 482/53 |
| 5,512,025 A * | 4/1996 | Dalebout et al. | ................. | 482/6 |
| 6,503,173 B2 * | 1/2003 | Clem | ................ | 482/8 |
| 6,527,674 B1 * | 3/2003 | Clem | .............. | 482/8 |
| 7,063,643 B2 * | 6/2006 | Arai | ................. | 482/8 |
| 7,628,732 B1 * | 12/2009 | Porszasz et al. | ................ | 482/54 |
| 7,717,827 B2 * | 5/2010 | Kurunmaki et al. | ............. | 482/8 |
| 7,722,504 B2 * | 5/2010 | Younger | ............................ | 482/9 |
| 7,766,794 B2 * | 8/2010 | Oliver et al. | ...................... | 482/8 |
| 7,837,596 B2 * | 11/2010 | Astilean | ............................ | 482/8 |
| 7,846,067 B2 * | 12/2010 | Hanoun | ............................ | 482/8 |
| 8,613,689 B2 * | 12/2013 | Dyer et al. | ......................... | 482/8 |
| 2003/0078786 A1 * | 4/2003 | Ulrey | ..................... | A63B 69/00 705/500 |
| 2004/0029684 A1 * | 2/2004 | Zarif | ................................. | 482/8 |
| 2004/0198555 A1 * | 10/2004 | Anderson | .............. | A63B 24/00 482/8 |
| 2004/0241629 A1 * | 12/2004 | Ondrusz et al. | .............. | 434/247 |
| 2005/0101884 A1 * | 5/2005 | Weeks | ................. | A61B 5/0205 600/587 |
| 2005/0209051 A1 * | 9/2005 | Santomassimo | ....... | A63B 24/00 482/8 |
| 2006/0063980 A1 * | 3/2006 | Hwang et al. | ................. | 600/300 |
| 2006/0183602 A1 * | 8/2006 | Astilean | ........................... | 482/7 |
| 2007/0005395 A1 * | 1/2007 | Singh | ................ | 705/2 |
| 2007/0213126 A1 * | 9/2007 | Deutsch et al. | ................ | 463/36 |
| 2007/0232452 A1 * | 10/2007 | Hanoun | ............................ | 482/6 |
| 2007/0232454 A1 * | 10/2007 | Kagan et al. | ..................... | 482/8 |
| 2007/0232455 A1 * | 10/2007 | Hanoun | ............................ | 482/8 |
| 2007/0293371 A1 * | 12/2007 | Hilfiker et al. | ................... | 482/9 |
| 2008/0059064 A1 * | 3/2008 | Werner | .............. | A63B 24/0062 455/456.3 |

(Continued)

OTHER PUBLICATIONS

Aeries Student Information System Physical Fitness—District May 6, 2013.*

(Continued)

*Primary Examiner* — Stephen Crow
(74) *Attorney, Agent, or Firm* — James G. Passé; Passé Intellectual Property, LLC

(57) ABSTRACT

The present invention relates to a physical fitness test which is easy to do, easy to monitor and is easily self correcting. It involves taking a push, pull, core, and cardio test that is easy to do but can be measured for like age and gender individuals.

21 Claims, 1 Drawing Sheet

(56) References Cited

U.S. PATENT DOCUMENTS

| | | | | |
|---|---|---|---|---|
| 2008/0071794 A1* | 3/2008 | Barnard | ............ | A63B 24/0062 |
| 2009/0047644 A1* | 2/2009 | Mensah | ............ | A63B 24/0075 |
| | | | | 434/247 |
| 2009/0219159 A1* | 9/2009 | Morgenstern | .......... | A63B 24/00 |
| | | | | 340/573.1 |
| 2009/0269728 A1* | 10/2009 | Verstegen | ........ | A63B 21/00196 |
| | | | | 434/247 |
| 2010/0179027 A1* | 7/2010 | McGlynn | ............ | A63B 24/0075 |
| | | | | 482/9 |
| 2010/0216600 A1* | 8/2010 | Noffsinger et al. | ............... | 482/5 |
| 2011/0040193 A1* | 2/2011 | Seppanen et al. | ............ | 600/481 |
| 2011/0082641 A1* | 4/2011 | Werner | ............ | A63B 24/0062 |
| | | | | 701/472 |
| 2011/0137678 A1* | 6/2011 | Williams | ........................... | 705/3 |
| 2011/0202268 A1* | 8/2011 | Werner | ............ | A63B 24/0062 |
| | | | | 701/532 |
| 2011/0212424 A1* | 9/2011 | Smith | .................... | G06Q 10/10 |
| | | | | 434/247 |
| 2012/0015778 A1* | 1/2012 | Lee | .................... | A63B 71/0622 |
| | | | | 482/8 |
| 2012/0029370 A1* | 2/2012 | Rocker et al. | ................ | 600/508 |
| 2012/0196256 A1* | 8/2012 | Maeueler et al. | ............ | 434/247 |
| 2012/0232360 A1* | 9/2012 | Maueler et al. | .............. | 600/301 |
| 2013/0023739 A1* | 1/2013 | Russell | ......................... | 600/301 |
| 2013/0066449 A1* | 3/2013 | Verstegen | ........ | A63B 21/00196 |
| | | | | 700/91 |
| 2013/0178958 A1* | 7/2013 | Kulach | ............. | A63B 24/0021 |
| | | | | 700/91 |
| 2013/0236868 A1* | 9/2013 | Erkkila | ........................ | 434/247 |
| 2014/0273925 A1* | 9/2014 | Burgett et al. | ................ | 455/405 |
| 2015/0039261 A1* | 2/2015 | Kim et al. | ..................... | 702/141 |
| 2015/0066170 A1* | 3/2015 | Harris et al. | .................... | 700/91 |
| 2015/0066683 A1* | 3/2015 | Azose | ................ | G06Q 30/0631 |
| | | | | 705/26.7 |
| 2015/0209616 A1* | 7/2015 | Azose | ................ | G06Q 30/0631 |
| | | | | 434/247 |

OTHER PUBLICATIONS

The Washington Post, How to Score Your Test, http://www.washingtonpost.com/wp-srv/style/guideposts/fitness/post/score.htm, Jun. 6, 2011.

* cited by examiner

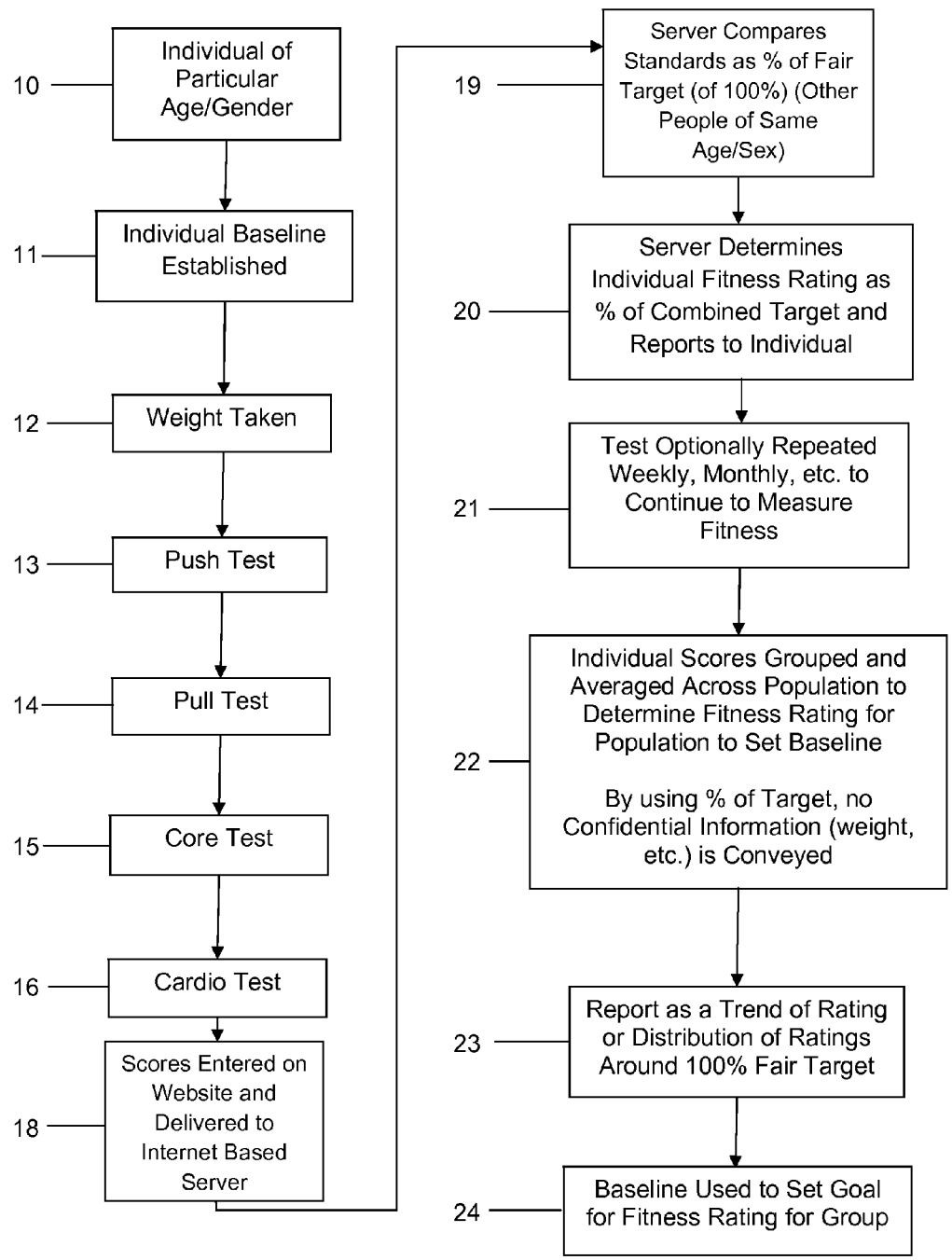

SELF CORRECTING FITNESS TEST

This application is a continuation-in-part of US non-provisional application number 13/187,583 filed on Jul. 21, 2011 and is incorporated herein in its entirety by reference.

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a fitness test. In particular, the present invention relates to a fitness test for use with a computer, such as a laptop, desktop or smart phone over the internet with a self correcting aspect that gives immediate feedback and is difficult to falsify results.

2. Description of Related Art

The measurement of the fitness of an individual is subject to a number of differing assessments. In general, fitness testing is done under the supervision of testing personnel because of the difficulty of performing the test correctly and the tendency for individuals to cheat when left to their own measurements. Measurement of respiratory gases tests a person's maximal oxygen uptake but requires expensive equipment to make an assessment. There are many methods to further assess fitness using sub maximal exercise, but again it is always necessary to have trained personnel observe the testing. Some field tests can be done not requiring exercise equipment but again are difficult and impossible to be utilized without trained personnel.

Other tests can combine measurement of things such as heart rate and speed used performing an exercise, accelerometers and using GPS or other tracking devices. The biggest problem is that without more into these tests are not clear indicators of the improvement of an individual and are difficult or expensive to repeat on a regular basis to measure change in a particular fitness profile.

Currently, there is no system which is cost effective and efficiently measures fitness by an individual at home that can be used on a daily basis or as frequently as desired and where the accuracy of the measurements can be checked by an independent professional to see if the measurements by the individual are/were accurate. Accordingly, a more accurate home fitness system is desirable. Compliance is also an issue and the present method allows compliance monitoring as well. Also, there is a need to be able to track group fitness as a whole without providing actual data for an individual, i.e. rate a person without data anonymously.

BRIEF SUMMARY OF THE INVENTION

The present invention relates to a multi part fitness test over the internet which overcomes the problems associated with home fitness testing and can easily be verified after the testing comprising measurement of an individual's weight and sex along with a push, pull, core and cardio test. In addition, the measurement, aggregation and presentation of data on a population to identify a baseline and set a target in one embodiment without providing confidential info, is provided. It is not a system of exercise, rather solely a measure of fitness relative to a group at a particular point of time.

Accordingly, one embodiment of the present invention relates to a self administered and self reporting fitness test for an individual of a particular age and sex for determining the relative fitness of the individual to a group of people comprising the method of:

a) establishing a database on a server connected to the internet, the server populated with known fitness test results of the group of people of the same age and sex as the individual;

b) the individual taking their weight and performing exercises to achieve fitness test results the exercises consisting of:
   i) a maximum number of repetitive push exercises;
   ii) a maximum number of repetitive pull exercise;
   iii) a maximum number of repetitive core exercises;
   iv) a cardio-distance exercise over a specific time;

c) the individual using a computer connected to the internet to deliver the exercise test results to the server;

d) the server comparing the individual's test results to the known test results in the database for someone of the same age and sex as the individual that is in the group; and e) the server determining the relative state of fitness of the individual based on the results of the comparison and reporting the results to the individual.

In another embodiment, an internet based fitness test system for determining the relative fitness of an individual to a group of people without the need of a professional observer comprising:

a) a database on a server connected to the internet populated with fitness test results of the group of people of a plurality of sexes and ages, the fitness results the result of performing exercises consisting of:
   i) a maximum number of repetitive push exercises;
   ii) a maximum number of repetitive pull exercise;
   iii) a maximum number of repetitive core exercises;
   iv) a cardio-distance exercise over a specific time;

b) the server having a computer program designed to receive exercise test results from an individual and compare the test result of the individual to the test results of people on the database of the same sex and age as the individual;

c) the server having a system reporting the results of the comparison to the individual.

BRIEF DESCRIPTION OF THE DRAWINGS

FIG. 1 is a flow chart of the method of implementation of the present invention including optional embodiments.

DETAILED DESCRIPTION OF THE INVENTION

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

DEFINITIONS

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawing featured in the figures is for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "self administered" refers to a fitness test which is capable of easily and correctly being performed with or without the aid of a physical fitness instructor or some other medical or athletic coach to monitor the progress of the fitness test which is non-subjective in nature (i.e. reports a number of repetitions or a time). In one embodiment, the user reviews a video, e.g. on a website, to teach the user how to conduct the test by themselves. Though one so skilled could later observe (e.g. video camera over the internet) the administration of the test to see if the test can actually be performed to the level a person claims to have done, it is clear that it refers to testing capable of being done by an individual without spotting, coaching or the like. Likewise "self reporting" refers to the ability of an individual to not need judgment in measuring the result and report it to a website over the internet to a server, a number or a time of completion (seconds, minutes, etc) is reported for each level. In most cases this means either performing a certain exercise a number of times, for a particular time taking ones weight accurately and measuring the distance one can cover in a limited amount of time. It can mean doing repetitions or distance as much as possible in a given time, or how long exercise can be done and the like. An "individual" refers to a human subject in need of physical fitness testing who can perform and repeat the test over a period of time in order to measure the progress/change of fitness results with the test.

The individual of a particular age and sex that is taking the self administered fitness test first would take their own weight at the time of the fitness test. The weight would best be taken in some repetitive way, i.e. same time of day, same scale, same amount of clothing, and the like but in general the weight of the individual is taken. The test can be done with a less accurate weight as well but the more accurate the weight the better the overall result of the testing. In addition, the individual will need to note their age and their sex for determination of the results of the exercise test in comparison with other individuals of the same or similar sex, weight and age in the group being measured against. Such comparison data can either be generated for a group or at least some of the data for individual parts of the test are available in the public domain, for example, the Washington Post publishes scores for parts of the test such as sit-ups and push-ups based on age and sex, and such could be modified to include weight by testing multiple individuals. A guide for very poor to superior performance is included. Any standardized data could be utilized or created for the test, e.g. military standards or the like. The test data is placed (populated) on a server (i.e. one or more servers) which is connected to the internet (and can have a website access for the individual.) The test data is organized by sex and weight for comparison and the server will have the data in a resident memory and be able to compare the database data to any data recovered for the individual. In general, merely comparing numbers for someone of the same age and sex and weight. However, all parts of the test must be taken to obtain relative results.

The test of the present invention has four different parts to it when taken together (and only when taken together) form the basis of the fitness test that has never been put together to monitor the progress of an individual in terms of overall fitness and weight over the internet in a repeatable manner. It has been discovered that weight is directly correlated with the test results, meaning it is difficult if not impossible to cheat on the test because of the discovery that individual weight is a limiting factor in the performance of the entire test. The test consists a repetitive push, pull and core exercise in combination with a cardio-distance exercise for covering a particular distance over a given time. The results of the individual test are then compared to known values of people in a group of the same age and sex for determination of fitness relative to that comparison group. Obviously, the group can be varied based on general population, a group such as a company or organization, elite athletes, or any comparison group that the individual's fitness is to be measured against. Weight and fitness can also be compared, set as a goal, or mentioned as it impacts the results though not the test itself.

As used herein the term "computer" is intended to include any data retrieving device connected to the internet (e.g. via a website) that can transmit data to the server including a desktop, a laptop, a tablet, a mainframe, a server, a smart phone, or the like.

As used herein a "repetitive push exercise" refers to an exercise using the arms wherein the triceps and pectorals are the main muscle groups involved in the repetitive exercise. Preference is given to an exercise with little or no equipment. Examples of push exercises include push-ups of all kinds (wide grip, incline, standard, military, etc), weighted triceps extensions, and any triceps based repetitive exercise. The test can be set up to include a maximum number or reps of the exercise at one time or a maximum time one can perform the exercise. The result then is reported as a number (number or time).

As used herein "repetitive pull exercise" refers to an exercise using the arms wherein the biceps and latissimus dorsi are the main muscle groups involved in the repetitive exercise. Preference is given to little or no equipment. Examples of pull exercises are standard pull-ups, chin-ups, wide grip pull-ups, bent over rows, dead lifts, flex arm hang (where the number of repetitions would be the endurance time), and the like bicep-based repetitive or timed exercises. The test can be set up to include a maximum number of reps of the exercise at one time or the time one can perform the exercise. The result is reported as a maximum number of repetitive pull exercises (number or time).

As used herein "repetitive core exercise" refers to an exercise that works the abdominals or other related stomach, chest and mid to lower back muscle groups in a repetitive exercise. Preference is given to little or no equipment. Examples of core exercises are crunches, sit-ups, knee touches, and the like. The test can be set up to include a maximum number of reps of the exercise at one time or a maximum time the exercise can be done. The result is reported as a number (number or time).

As used herein a "cardio-distance exercise over a specific time" refers to an aerobic exercise wherein the picking of a particular time for the exercise is done and then allowing the individual to cover the distance by walking, running, or other method and attempting to cover the greatest distance during that time. For example, in one embodiment, the time is 12 minutes and the individual covers the greatest distance possible by walking, biking, swimming, elliptical training, running, or the like, or a combination during that time. In general, any time or cardio distance method could be selected but for the purpose of a test it needs to be short enough it can be done easily but long enough to test aerobic fitness. In general, a specific time selected from about 1 minute to about 30 minutes, about 5 to 15 minutes or about 10 to 15 minutes are embodiments of times that could be utilized as a range to select a time for the test. Once a cardio distance test method is selected, it should be utilized in repetitious testing. The result is reported as a distance covered during the time.

Once the exercises are completed, each of the exercise test results are sent to the server which collects the results and compares the results for a like age and sex individual on the server in resident memory to determine the fitness compared to other people in the group (i.e. a relative determination). One of the benefits of this fitness test is that for a given individual, progress and results by definition, will need to be within certain averages and hence it would be clear or at least suggest based on those parameters when an individual would be guessing or cheating. Under those circumstances, the test can be repeated in front of another individual, such as a fitness professional, a coach, a personal trainer, peer, or the like, to test if the test results reported are accurate. By repeating the test at intervals like weekly, monthly, or the like, progress can be checked in a manner that is representative of true health fitness, is easy for the individual to accomplish in a short period of time, and can be checked by repetition in front of a professional where necessary. In other words it is not suggesting a fitness regime or the like, only a repeatable determination of the user's relative fitness status relative to the database.

Likewise, by tracking the progress of the individual in this manner a goal can be set based on the individual's age and sex and repeated tests can measure the progress toward the goal. The goal can be weight targeted or other desired health metrics though this method does not suggest how to accomplish, only to determine status in an easy and repeatable manner.

Now referring to the drawings, the figure represents an embodiment of the method of the test though particular individual exercises could be accomplished in any order. The time for completing the entire test is such that each test is completed within a reasonable time of the next test, a few seconds to minutes between each test though performing each with great times between would also produce results within the scope of the invention that would measure progress. What is important is the test be repeated in the same manner each time.

FIG. 1 depicts a flow chart of the implementation of an embodiment of the relative fitness test of the present invention. An individual of a particular age and sex 10 prepares and is ready to take the fitness test of the present invention. At some point right before, after or during the test, the weight of the individual is taken 12 by normal means, such as scale or the like, metrics are established 11 to get a baseline especially if weight is a goal. The series of exercise tests begin and in any order. For example, the push test 13 is taken doing as many pushups as possible. The pull test 14 is next, accomplished wherein an individual in one embodiment does as many pull-ups as possible. Next a core test 15 is done to test core fitness such as many sit ups as possible by the individual. Lastly, the cardio-distance test 16 is done where an individual traverses the largest distance possible over a selected test time. In one example the cardio test 15 is the greatest distance an individual can cover walking or running in a timed 12 minute period.

Each of the test results 13 through 16 and the individuals weight, age and sex is transmitted to a server over the internet populated with a group's test results, and are then individually compared to the group 16 on the server for that individual of like age and sex to determine where the fitness level is for that individual in comparison to others in a standardized comparison group data on the server. The weight 12 can be repeatedly taken to check fitness progress (measure) toward weight or fitness goals, but not as a method in itself to change weight or fitness.

Series of the exercise tests are entered 18 into a computer database over the internet on a server and then individual metrics (test results) are compared to standards of the group as a percent of a fair target 19. Individual metrics are combined to determine and individual fitness rating as a percentage of a combined fair target 20. The test is repeated 21 on a regular basis weekly, monthly, or the like to measure progress in general or towards a goal.

Scores from individuals are grouped and averaged across a selected population to determine a fitness level compared to those in the select population 22 (e.g. company, city, organization etc.). By utilizing percentage, in one embodiment, of a target goal rather than actual test results, no confidential info is conveyed to observe group progress. The individual can have their results relative to the group without anyone (but the server) knowing the results. Then a report prepared as a trend of a rating or distribution of rating of the group is conveyed 23 around a target. A baseline can then be utilized to set goals for a fitness for the entire group 24 as a whole without individual data.

The result of the single fitness test gives but one point in time of relative fitness, however, repetition of the fitness test over time gives on a chartable progress of fitness either good or bad such that progress or lack thereof can easily be charted. With the test being simple to implement, hard to cheat on, and not taking much time, this particular fitness test is an improvement over prior tests which did not have the benefits indicated above for a fitness test especially for a self administered fitness test such as the present invention fitness test. It is easy to administer because results can be reported over the internet in a non-subjective manner. Again, this test is not done to improve fitness and in fact does not, rather it measures fitness at a given time.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A method for determining the fitness at a given point in time of an individual of a known weight, age, and sex relative to a group of people without the need of a professional observer consisting of:
   a) assembling a database on a server connected to the internet populated with fitness test results of the group of people of a plurality of weights, sexes and ages, wherein the weight of the people has been taken repeatedly, the fitness test results being the result of performing exercises consisting of:
      i) a maximum number of repetitive push exercises;
      ii) a maximum number of repetitive pull exercise;
      iii) a maximum number of repetitive core exercises; and
      iv) a distance covered of a cardio-distance exercise over a specific time
   wherein the specific time has been measured by the people performing the exercise during the performance of the cardio-distance exercise;
   b) the individual performing the fitness test of a) and uploading the test results and age, weight and sex to the server;
   c) a computer program on the server receiving exercise test results from the individual and comparing the test results of the individual to the test results of people of the same sex, age and weight on the database; and
   d) the server reporting the results of the comparison to the individual.

2. The fitness test system method according to claim 1 wherein when the individual is tested a plurality of times over a selected period of time, the server can monitor and report the change as a measure of a change of fitness in the individual over time.

3. The fitness test system method according to claim 1 wherein the individual connects to the server utilizing a website.

4. the fitness test system method according to claim 1 wherein the weights of the individuals on the database are reported in the comparison.

5. The fitness test system method according to claim 1 wherein the push exercise is a push up.

6. The fitness test system method according to claim 1 wherein the pull exercise is a pull up.

7. The fitness test system method according to claim 1 wherein the core exercise is a sit up.

8. The fitness test system method according to claim 1 wherein the cardio exercise is running or walking for the greatest distance the individual can cover over a select period of time.

9. The fitness test system method according to claim 1 which further comprises a computer utilized by the individual to access the server.

10. The fitness test system method according to claim 9 wherein the computer used by the individual is a smartphone.

11. The fitness test system method according to claim 1 wherein the server is designed to provide the individual with a fitness goal and the fitness test system is utilized to determine progress towards the fitness goal.

12. The fitness test system method according to claim 11 wherein the fitness goal is to achieve a particular weight of the individual.

13. The fitness test system method according to claim 1 which comprises a plurality of individuals in a selected group, each performing the test.

14. The fitness test system method according to claim 13 wherein the group sets a target fitness goal for the entire group as a whole.

15. The fitness test system method according to claim 13 wherein the server is designed to report the results to the individual as a percentage of the fitness goal target.

16. The fitness test system method according to claim 13 wherein the fitness goal is a group goal.

17. The fitness test system method according to claim 16 wherein the group test results are reported by the server anonymously.

18. The fitness test system method according to claim 1 wherein the weight of the individual is taken.

19. The fitness test system method according to claim 1 which further comprises the individual connected to the server using an internet website.

20. The fitness test method according to claim 1 wherein the results of the comparison are for someone of the same age and sex.

21. The fitness test method according to claim 1 wherein the specific time measured for the cardio-distance exercise is from 1 to 30 minutes.

* * * * *